US012810306B2

(12) United States Patent
Storey et al.

(10) Patent No.: US 12,810,306 B2
(45) **Date of Patent: *Nov. 24, 2026**

(54) OPTICAL IDENTIFICATION OF TELECOMMUNICATIONS EQUIPMENT

(71) Applicant: Level 3 Communications, LLC, Denver, CO (US)

(72) Inventors: Jeffrey K. Storey, Boulder, CO (US); Clyde David Cooper, Louisville, CO (US); Carlos Santiago, Aurora, CO (US); Ron Lewis, Montgomery, AL (US); Steven M. Casey, Littleton, CO (US); Stephen Opferman, Denver, CO (US)

(73) Assignee: Level 3 Communications, LLC, Denver, CO (US)

( * ) Notice: Subject to any disclaimer, the term of this patent is extended or adjusted under 35 U.S.C. 154(b) by 190 days.

This patent is subject to a terminal disclaimer.

(21) Appl. No.: 18/916,087

(22) Filed: Oct. 15, 2024

(65) Prior Publication Data

US 2025/0037138 A1 Jan. 30, 2025

Related U.S. Application Data

(63) Continuation of application No. 18/382,217, filed on Oct. 20, 2023, now Pat. No. 12,125,046, which is a (Continued)

(51) Int. Cl.
*G06Q 30/016* (2023.01)
*G06F 18/21* (2023.01)
(Continued)

(52) U.S. Cl.
CPC ......... *G06Q 30/016* (2013.01); *G06F 18/217* (2023.01); *G06K 7/10297* (2013.01); (Continued)

(58) Field of Classification Search
CPC . G06Q 30/016; G06F 18/217; G06K 7/10297
See application file for complete search history.

(56) References Cited

U.S. PATENT DOCUMENTS 12,125,046 B2 * 10/2024 Storey .................. G06Q 30/016
2017/0257279 A1 9/2017 Mishra
(Continued)

FOREIGN PATENT DOCUMENTS

WO WO-2019131742 7/2019

*Primary Examiner* — Myron Wyche

(57) ABSTRACT

Examples of the present disclosure relate to the optical identification of telecommunications equipment. In examples, a user interacts with an application to capture image data relating to a device according to instructions presented to the user. The application may further generate metadata, such as user responses to one or more questions. The image data and/or metadata are evaluated using a machine learning model to generate an equipment classification for devices pictured therein. The data may also be used to generate an equipment configuration for the device, as well as an operational state (e.g., based on one or more indicators present on the device, log data, etc.). Accordingly, such information may be used to update a pre-existing inventory record for the device, or generate a new inventory record. In other examples, such information is used to generate one or more predicted issues and associated actions to troubleshoot the device.

14 Claims, 8 Drawing Sheets

Related U.S. Application Data continuation of application No. 17/109,694, filed on Dec. 2, 2020, now Pat. No. 11,798,005.

(60) Provisional application No. 63/075,459, filed on Sep. 8, 2020, provisional application No. 62/942,421, filed on Dec. 2, 2019.

(51) Int. Cl.

| | |
|---|---|
| ***G06K 7/10*** | (2006.01) |
| ***G06K 19/07*** | (2006.01) |
| ***G06N 20/00*** | (2019.01) |
| ***G06Q 10/087*** | (2023.01) |
| ***G06T 7/00*** | (2017.01) |
| ***G06V 10/20*** | (2022.01) |
| ***H04L 41/0631*** | (2022.01) |
| ***H04L 41/069*** | (2022.01) |
| ***H04L 41/147*** | (2022.01) |
| ***H04L 41/149*** | (2022.01) |

(52) U.S. Cl.

CPC ......... *G06K 19/0723* (2013.01); *G06N 20/00* (2019.01); *G06Q 10/087* (2013.01); *G06T 7/0004* (2013.01); *G06V 10/255* (2022.01); *H04L 41/0631* (2013.01); *H04L 41/069* (2013.01); *H04L 41/147* (2013.01); *H04L 41/149* (2022.05); *G06K 2007/10504* (2013.01); *G06T 2207/20081* (2013.01)

(56) References Cited

U.S. PATENT DOCUMENTS

| | | | |
|---|---|---|---|
| 2020/0084234 | A1 | 3/2020 | Kair |
| 2021/0166081 | A1 | 6/2021 | Storey |
| 2024/0046278 | A1 | 2/2024 | Storey |

* cited by examiner

OPTICAL IDENTIFICATION OF TELECOMMUNICATIONS EQUIPMENT

BACKGROUND

It is helpful to know what telecommunications equipment is located at the premises of a customer, for example in a customer service scenario involving adding new equipment, configuring services, troubleshooting issues, etc. However, identifying customer equipment and maintaining an accurate inventory may be difficult, as the equipment that is in use may change over time or may be relocated. Further, the customer may not be knowledgeable about telecommunications equipment and may therefore be unable to identify or otherwise describe the equipment in detail to a customer service representative.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure relate to the optical identification of telecommunications equipment. In examples, an application is used to capture images, videos, or other image data relating to a device. The image data may be captured according to image capture instructions that are presented to the user. The application may further generate metadata, such as user responses to one or more questions. The image data (and, in some instances, metadata) is transmitted to a server, where it is evaluated using a machine learning model. The model generates an equipment classification for devices pictured therein. The data may also be used to determine an equipment configuration for the device, as well as an operational state. As an example, the operational state is determined according to one or more indicators present on the device and, in some examples, log data associated with the device.

Accordingly, such information may be used to update a pre-existing inventory record for the device, or generate a new inventory record. In other examples, the equipment classification, equipment configuration, and operational state are used in conjunction with a troubleshooting rule to generate one or more predicted issues for the device. Such predicted issues may be used to generate one or more associated actions, including, but not limited to, automatically reconfiguring or restarting the device, presenting instructions to a user of the application, or connecting the user to a customer support representative.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
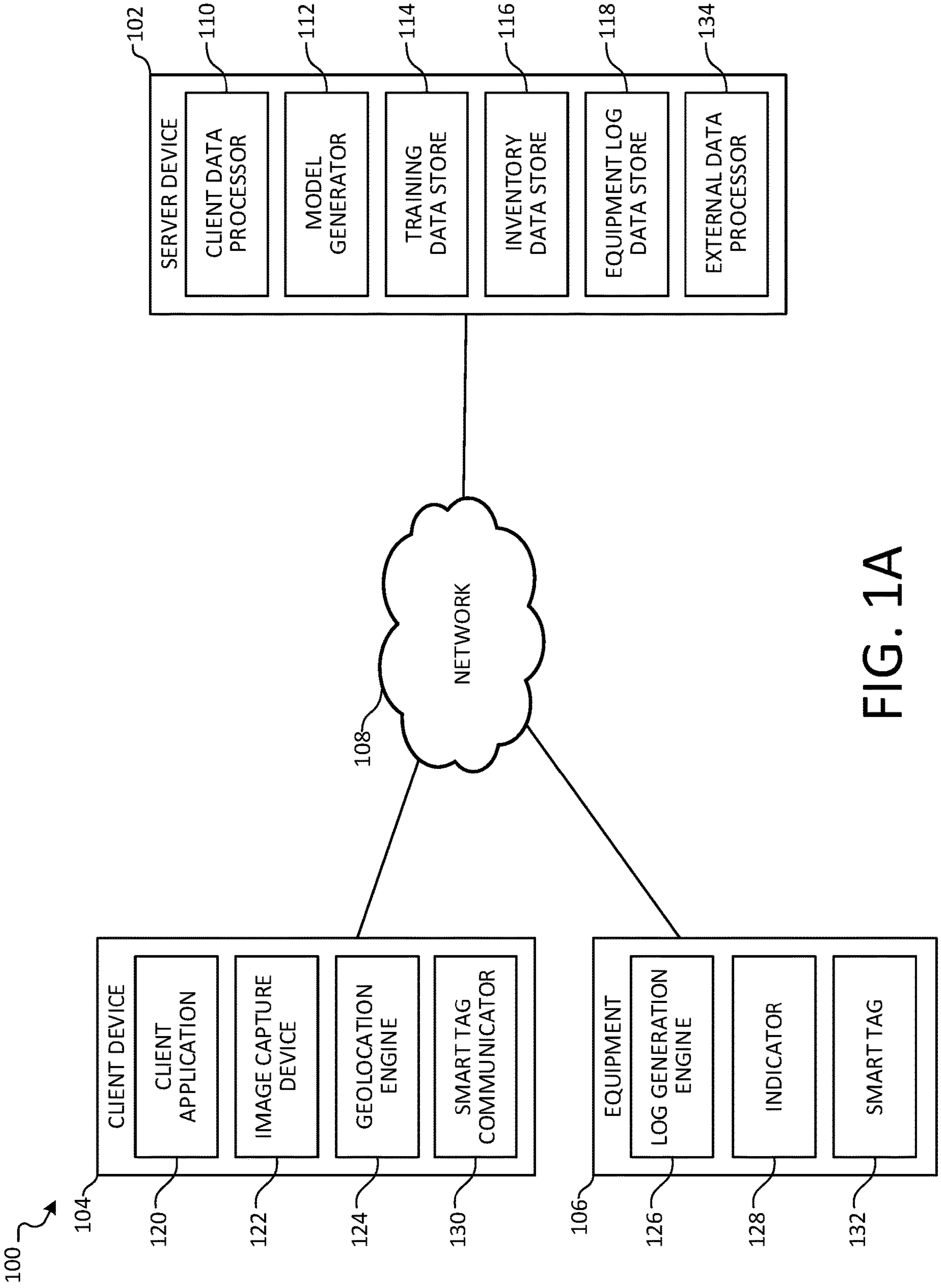
FIG. 1A illustrates an overview of an example system for optical identification of telecommunications equipment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A challenge in telecommunications is the identification of telecommunications equipment used by a service provider to provide one or more services to a customer, which may be located at the physical premises of the customer (e.g., in an enterprise context, in a consumer context, etc.). Such equipment may not be inventoried in a database of the service provider or it may be incorrectly inventoried. For example, there may be no inventory record of the equipment at the customer premises. As another example, an inventory maintained by the service provider may have a record for the equipment, but it may be incorrect (e.g., it may have an incorrect location, make, model, status, and/or configuration, etc.). Further, it is difficult to update the inventory, as the customer may not be knowledgeable about telecommunications equipment or may have equipment from a variety of service providers or equipment manufacturers. The lack of inventory correctness presents a significant challenge to serving the needs of that customer.

Accordingly, aspects of the present disclosure relate to techniques for the optical identification of telecommunications equipment. In examples, a customer uses a client application to describe an issue relating to telecommunications equipment and/or a service provided by a service provider. In other examples, the client application is used to take inventory of a customer premises, such as by a service-provider technician. The client application enables the customer to capture one or more images and/or videos (among other image data) of on-premises equipment. Metadata may be collected, including, but not limited to, exchangeable image file format (EXIF) data (e.g., a timestamp, a geographic location, etc.), answers to one or more questions, and/or other information provided by the customer. The image data (and, in some examples, the metadata) is analyzed using a machine learning model to classify equipment identified accordingly. A configuration and/or operational state may further be determined for the identified equipment. Such data may then be used to troubleshoot the issue described by the customer. In some instances, log data associated with the classified equipment may also be accessed and analyzed when troubleshooting the issue. A recommended action may be generated, an action may be performed automatically, or the customer may be directed to a customer support representative, among other examples. In other examples, the equipment classification is used to update an inventory associated with the customer.

As used herein, "telecommunications equipment" refers to any of a variety of devices used to provide a service to a customer and may be used interchangeably with a telecommunications "device." Example telecommunications equipment includes, but is not limited to, a modem, a software defined wide area network (SD-WAN) gateway, a firewall, a router, a switch, an access point, or a unified customer premises equipment (uCPE) device. As another example, telecommunications equipment may comprise cabling, such as one or more ethernet cables or fiberoptic cables. Thus, it will be appreciated that telecommunications equipment need not be restricted to devices, and may further comprise cabling or other peripheral hardware. In examples, telecommunications equipment may be owned by the service provider, leased from the service provider by the customer, owned by the customer, or any combination thereof.

An inventory of telecommunications equipment for a customer may be maintained by a service provider, where each device is, or several devices are, associated with an inventory record. In examples, an inventory record comprises information associated with the telecommunications equipment, including, but not limited to, device location, a make, a model, a device status (e.g., an online status, an offline status, a warning status, an error status, etc.), and/or device configuration information (e.g., other equipment with which the device is connected and/or communicates, authentication credentials, configured capabilities, etc.). As an example, the inventory comprises equipment associated with the service provider. In another example, the inventory further comprises equipment associated with one or more other service providers or third-party equipment manufacturers, which may be used to identify potential incompatibilities or to provide an indication as to which set of equipment is associated with the service provider as compared to equipment of another service provider, among other benefits.

In a technical support scenario, a client enables a customer to indicate an issue (e.g., as a selection from a list of issues, as a brief description of the issue, etc.). As used herein, a "client" is a client application executed by a client device unless otherwise specifically described. In examples, the client application can include a native application running on the client device and/or a browser or other portal used to access an application or functionality provided on a remote server. The client displays instructions to capture image data associated with telecommunications equipment at the premises of the customer. For example, the customer may be instructed to take a picture of one or more on-premises devices, one or more sides of a device, and/or of wiring between multiple devices. In another example, the customer may be instructed to capture a video of one or more indicator lights on a device. Thus, it will be appreciated that image data includes, but is not limited to, one or more pictures, a video or a set of frames from a video, and/or a video stream. In examples, the instructions displayed by the client application are generated based at least in part on the issue indicated by the customer. Additionally, while examples disclosed herein are discussed in the context of a customer operating a client or performing other actions, it will be appreciated that any of a variety of other users may perform the aspects described herein, such as a service technician.

In some examples, the client generates metadata in addition to the image data. For example, a geographic location may be determined based on the location of the computing device on which the client application is executing. As another example, the geographic location is embedded as part of EXIF data within the image. In a further example, the client application presents a set of questions to the user, such that the user enters additional information in response. Example questions include, but are not limited to, an estimated installation date of the equipment, visible markings associated with the equipment (e.g., a model number, a manufacturer name, handwritten notes on the equipment or associated wiring, etc.), and/or more specific location information (e.g., a building floor, a room or building number, etc.).

Telecommunications equipment may be identified by a smart tag. For example, a service provider may affix, program, or otherwise configure a smart tag that identifies the telecommunications equipment. In examples, the smart tag comprises a unique identifier that is associated with an entry in a database, such as an inventory record according to aspects described herein. In other examples, the smart tag stores configuration information associated with the telecommunications equipment, or may store any of a variety of other information. A smart tag may be active or passive. For example, an active smart tag may communicate with another device (e.g., a mobile device of a service technician). Example communications include, but are not limited to, a transmission comprising an associated unique identifier or receiving an indication to provide a visual or audible indication that enables a user to physically identify the location of the telecommunications equipment. As another example, a passive smart tag may be activated by a device (e.g., using inductive coupling, as is used in near-field communication (NFC) or radio-frequency identification (RFID) tags), thereby enabling the device to access information stored by the passive smart tag or cause the passive smart tag to provide a visual or audible indication.

Instructions that are presented to a user (e.g., to capture image data associated with telecommunications equipment) may further comprise instructions to cause a device to interact with a smart tag, such as instructing the user to position the device at a certain location with respect to the telecommunications equipment or to identify a particular visual or audible indication, among other examples. At least a part of the information that is collected from a smart tag may be included in the metadata that is associated with the image data. It will be appreciated that while example smart tag types and associated technologies and interactions are described herein, any of a variety of smart tag technologies may be used.

In examples, the client application transmits the image data and any collected metadata to a server, where a machine learning model processes the received equipment data to classify any telecommunications equipment within the image data. In other examples, some or all of such processing may occur on the client device if sufficient computing power is available. In some examples, the client device uses a machine learning model that is trained to perform more general classification, such as determining whether the telecommunications equipment is associated with a specific vendor, computing functionality, and/or service provider. By contrast, a server-side machine learning model may be trained to perform more specific classification, such as determining a specific model or configuration associated with the telecommunications equipment. Similarly, the client device may utilize metadata (e.g., a geographic location, information from a smart tag, etc.) to determine whether the client device is at the correct location or is proximate to telecommunications equipment having the correct identifier (e.g., as may be specified by a service ticket). Thus, the client device may generate determinations that are relevant to customer service and/or performing a service call, while the server device performs more in-depth processing to generate or update an inventory record, among other examples.

Example neural networks that may be used to generate the machine learning models described herein include, but are not limited to, a convolutional neural network, a recurrent neural network, or a deep neural network. In examples, the machine learning model is trained (at least initially) using image data associated with devices offered by the service provider. Image data and associated metadata received from a client according to aspects described herein may be stored and subsequently used to train a new model or retrain an existing model, such that model confidence may improve with continued use. Additionally, stored data may be reprocessed at a later date, such that previous classifications and associated processing may be updated using improved models. In some examples, different machine learning models are available, where each model is associated with a different type or family of devices, or a different service market (e.g., consumer versus business, region, type of service, etc.). Accordingly, a model may be selected from the set of available models according to the received metadata or information associated with the customer's account, among other considerations. For example, a model is selected based on metadata associated with the image data, such as an identifier from a smart tag, a geographic location, or question answers that were received from a user. In another example, multiple models are used (e.g., such that a classification is selected from the model with the highest confidence, as part of an ensemble, etc.).

In some examples, a confidence score of an equipment classification is below a predetermined threshold, or it may be determined that no telecommunications equipment is identified within the image data. As a result, an indication to request additional data may be received by the client. For example, the client may present alternative image capture instructions and/or additional questions. As another example, the indication may comprise image data with one or more highlighted regions and an instruction to the user to capture additional image data associated therewith. The user may be a service technician, and the indication may assist the service technician in capturing the additional image data and/or performing other actions relating to the telecommunications equipment, thereby enabling the service technician to perform tasks at a higher skill level without requiring that the service technician has already received associated training. In another example, the indication comprises a request that the customer enter device information from the telecommunications equipment. Accordingly, such additional data may be used to update the machine learning model, thereby improving recognition of such telecommunications equipment in the future. In other examples, the customer may be presented with the option to communicate with a customer-service representative.

Once the telecommunications equipment is classified, an inventory associated with the customer may be updated. For example, a pre-existing record is updated (or a new record is created) according to the equipment classification, the image data, and/or the metadata, thereby updating a device location, a model, a state, or a device configuration, among other examples. In some instances, one or more conflicts are identified and resolved. A conflict may be manually resolved (e.g., by a customer support representative, by the user of the client application, etc.) or may be automatically resolved based on an analysis of other equipment in the inventory of the customer or based on the metadata, among other considerations. As noted above, an inventory record may comprise at least a part of the image data and/or metadata, such that additional processing may be performed. For example, an inventory record may be updated using a retrained machine learning model after additional training data has been acquired according to aspects described herein.

An inventory record may be supplemented with information from one or more external data sources. An external data source may be determined based on the equipment classification (e.g., based on a model, vendor, etc.) and information associated with the equipment classification may be accessed from the determined external data source accordingly. For example, a website associated with a vendor may be accessed to retrieve specifications associated with telecommunications equipment, which may then be incorporated into the inventory record. In examples, such supplemental information may be cached or accessed from another inventory record, such that the external data source need not always be accessed to supplement an inventory record. Thus, an inventory record may comprise information provided by a service provider, generated using the optical identification techniques described herein, and/or accessed from one or more external data sources, among other examples.

The equipment classification may be used to provide technical support for the issue indicated by the user. As an example, a device configuration for the classified equipment is determined. The determination may comprise evaluating the image data to identify one or more other devices to which the equipment is connected. In another example, the image data is evaluated to identify the physical configuration of the equipment itself (e.g., how many ports or slots are in-use, whether certain functionality is installed or otherwise enabled, etc.). In some examples, configuration information may be stored by the service provider, which may be accessed and used to determine at least a part of the device configuration. For example, which services and/or associated service tiers the equipment is configured to provide.

In addition or as an alternative to the device configuration, a device state may also be determined. For example, a set of state rules is accessed and used to evaluate one or more indicators present in the image data. The state rules may be associated with a device type or device family, among other associations. As an example, a state rule may match a dark or illuminated state of a light-emitting diode (LED) or a set of LEDs, thereby determining the operational state of the device. In another example, a video is processed to determine that an LED is blinking or a pattern with which the LED is blinking, which may also be indicative of the operational state of the device. In other examples, the operational state may be determined at least in part from the answers received from the customer to questions presented in the client application. While example aspects are described with respect to LEDs as indicators, it will be appreciated that any of a variety of other indicators may be used, including, but not limited to, a seven-segment display or a liquid crystal display. Further, an indicator need not be optical. For example, an audible indicator may be identified in a video or video stream.

In some instances, the state determination comprises accessing log data associated with the telecommunications equipment. In such examples, the log data is processed to determine whether there are any relevant log entries (e.g., according to associated timestamps, according to the state determined based on device indicators, etc.). Log data may be generated server-side by the service provider and/or may be requested from the telecommunications equipment contemporaneously with the technical support aspects described herein, among other examples.

The equipment classification, the device configuration, and/or the operational state is then used to troubleshoot the telecommunications equipment. As an example, one or more troubleshooting rules are identified for the equipment. A troubleshooting rule may be based on a manual for the device or for a family of devices, where the troubleshooting rule evaluates the device configuration and/or operational state to generate a predicted issue and, in some instances, one or more actions to resolve the predicted issue. For example, a troubleshooting rule may comprise a flow chart having a series of decision points, each of which evaluates at least a part of the equipment classification, device configuration, and/or operational state. The evaluation of a subsequent decision point is dependent on determinations made at previous decision points. Ultimately, evaluation of a troubleshooting rule yields a determination of one or more predicted issues. In examples, predicted issues are categorized according to severity (e.g., minor, major, critical, etc.). A determined predicted issue may have one or more actions associated with it, or, in another example, a database of issues and associated actions may be queried to determine one or more actions associated with the predicted issue. Another example may include determining the presence of appropriate network cabling (e.g., as may be used to support either LAN or WAN interconnection, etc.) and/or determining whether cabling is plugged into an incorrect port, whether cabling is compliant with cabling practices, or if a cable is noncompliant with hardware recommendations.

Example actions include, but are not limited to, automatically restarting or reconfiguring the device remotely, altering server-side settings, generating a shipping return label, and/or ordering a replacement device. As another example, one or more cables may be identified for replacement (e.g., to avoid potential future incompatibilities, to remedy equipment limitations resulting from cable limitations, etc.) or a support ticket may be generated to facilitate cable rerouting in order to remedy non-compliant cabling. In some examples, troubleshooting instructions are determined for the predicted issue and provided to the client application for display to the user. As another example, an indication is provided to the client application to connect the client device to a customer support representative (e.g., via a telephone call, a text-based or video chat session, etc.). While example troubleshooting techniques and associated actions are described herein, it will be appreciated that a variety of other techniques and other robotic process automation actions may be used without departing from the present disclosure.

In some instances, a proactive determination may be made as an alternative or in addition to the troubleshooting techniques described above. For example, an equipment classification, device configuration, and/or operational state determined according to aspects described herein may be processed to identify telecommunications equipment that does not currently exhibit an issue, but should be proactively replaced or reconfigured. The determination to proactively replace or reconfigure telecommunications equipment may be made according to a proactive rule. For example, a proactive rule may comprise criteria that is indicative of decreased device performance or imminent failure. As another example, a proactive rule may comprise a set of equipment that is being phased out or has been marked obsolete by the service provider. Accordingly, one or more actions may be taken on telecommunications equipment that satisfies a proactive rule in addition to or as an alternative to telecommunications equipment that satisfies troubleshooting rules as described above. As another example, a proactive action is taken on telecommunications equipment that is not the subject of a service ticket or other remedial action, but is determined to exhibit an issue. For example, the disclosed aspects may be used to perform optical identification for a first device that is the subject of a service ticket, during which an issue may be identified for a second device, such that the identified issue may also be resolved while resolving one or more issues associated with the first device.

The optical identification techniques disclosed herein may also be used to identify excess capacity associated with telecommunications equipment. For example, an identified physical configuration of the telecommunications equipment may be evaluated to determine whether additional capacity exists. Examples of additional capacity include, but are not limited to, an unused port of a network card or network device or an empty expansion slot. Excess capacity may be identified indirectly (e.g., an indicator light associated with a port that is unlit) and/or directly (e.g., the empty port itself). As an example, instances of excess capacity may occur when telecommunications equipment is provided to a customer, but the customer does not utilize the telecommunications equipment to its full capacity. Thus, it may be difficult for the service provider to identify the excess capacity absent the optical identification techniques of the instant application.

An action may be taken in response to identifying excess capacity, including, but not limited to, generating a service ticket to replace the telecommunications equipment with replacement telecommunication equipment (e.g., that reduces capacity to be closer to current or anticipated utilization) or providing an indication (e.g., to a customer, to a sales representative) of one or more potential services offered by the service provider, which the customer may utilize in order to make use of the identified excess capacity. Accordingly, if the customer determines to utilize such a potential service, the potential service may be enabled with reduced overhead (e.g., processing time, setup expense, etc.) as a result of the excess capacity already being present.

In examples, a blockchain or other distributed ledger technology may be used to validate image data, metadata, and other data received from a client device. As an example, a validation record comprising at least a subpart of or a cryptographic hash associated with such data may be stored in a block. The validation record may further comprise a timestamp associated with when the data was received, as well as associated user information (e.g., a username, an email address, a customer account identifier, etc.). A subsequent block may be added to the blockchain according to blockchain technology, where the subsequent block includes a cryptographic hash of the previous block, such that validation records of the previous block may be immutable. A validation record may be associated with an inventory record, an action, and/or telecommunication equipment more generally. Accordingly, the validation record may be used to perform validation periodically or depending on a type of action or potential impact associated with an action (e.g., whether the action is likely to affect multiple users, have a monetary cost above a predetermined threshold, require replacement of telecommunications equipment, etc.), among other examples. Thus, application of blockchain technology to the optical identification techniques described herein enables confirmation of the source and validity of data, thereby reducing the potential for errors and fraud, among other potential issues.

FIG. 1A illustrates an overview of an example system 100 for optical identification of telecommunications equipment. As illustrated, system 100 comprises server device 102, client device 104, equipment 106, and network 108. Server device 102, client device 104, and equipment 106 are illustrated as communicating through network 108. Network 108 may comprise a local area network, a wide area network, and/or the Internet, among other examples. For example, server device 102 may communicate with equipment 106 over the Internet, while client device 104 may communicate with equipment 106 over a local area network. It will be appreciated that while system 100 is described with respect to one server device 102, one client device 104, and one piece of equipment 106, any number of such elements may be used in other examples.

Client application 120 of client device 104 is used in conjunction with server device 102 to troubleshoot an issue and/or update an inventory record associated with equipment 106. Client device 104 may be any of a variety of computing devices, including, but not limited to, a mobile computing device, a tablet computing device, a laptop computing device, or a desktop computing device. Client device 104 is illustrated as further comprising image capture device 122 and geolocation engine 124. Image capture device 122 captures images and/or videos (e.g., as files, as streams, etc.), among other image data. Image capture device 122 may have a sensor that is capable of observing infrared radiation (in addition to or as an alternative to visible light). Accordingly, image capture device 122 may determine the temperature of telecommunications equipment, such that equipment temperature may be included as metadata and processed according to aspects described herein. It will be appreciated that, in some examples, multiple image capture devices are used or, in other examples, image capture device 122 is separate from client device 104. For example, an image capture device may be located on-premises and may provide a video stream of the telecommunications equipment accordingly. Such an image capture device may be located in an equipment rack or may be installed within the telecommunications equipment itself, among other examples.

According to aspects described herein, client application 120 provides instructions for a user of client device 104 to use image capture device 122 to capture image data associated with equipment 106. In examples, geolocation engine 124 is used to determine a location of client device 104 and embed location information in the captured image data. Alternatively, the geolocation information may be communicated separately from the captured image data. Geolocation engine 124 may use the global positioning system (GPS), assisted GPS (A-GPS), Wi-Fi- and/or Bluetooth-based geolocation, or geolocation according to an Internet Protocol (IP address) associated with client device 104, or any combination thereof. Client device 104 is further illustrated as comprising smart tag communicator 130. In examples, smart tag communicator 130 implements any of a variety of technologies to communicate with smart tag 132 of equipment 106, including, but not limited to, Bluetooth, Wi-Fi, NFC, and/or RFID. As described above, smart tag communicator 130 may access any of a variety of information from smart tag 132, which may be included as metadata associated with image data captured by image capture device 122. Client application 120 may also generate a display of one or more prompts comprising questions to collect other metadata as described above. Client application 120 communicates the collected data to server device 102, which analyzes the data and generates a predicted issue and one or more actions. Client application 120 receives and displays the results of the analysis accordingly. As another example, client application 120 may take an action based on the received results. Additional aspects of client application 120 are discussed below with respect to FIG. 1C.

While client device 104 is described as a device that is physically operated by a user, it will be appreciated that client device 104 need not be such a device and may, in other examples, be autonomously or remotely operated. For example, a terrestrial or aerial drone may be used to surveil telecommunications equipment (e.g., using image capture device 122 and/or smart tag communicator 130).

Equipment 106 may be any of a variety of devices used to provide a service to a customer, including, but is not limited to, a modem, an SD-WAN gateway, a firewall, a router, a switch, an access point, or a uCPE device. In examples, server device 102 and equipment 106 are associated with a service provider, such as an internet service provider and/or a voice service provider, among other examples. Equipment 106 is illustrated as comprising log generation engine 126 and indicator 128. Indicator 128 provides an indication as to the state of equipment 106. For example, indicator 128 may be an LED, a seven-segment display, or a liquid crystal display, among other optical indicators. Further, indicator 128 need not be optical. For example, indicator 128 may comprise a speaker that generates one or more tones that are indicative of the state of equipment 106. It will be appreciated that, in other examples, equipment 106 comprises multiple indicators, each of which may be of the same type, of different types, or any combination thereof.

Equipment 106 is further illustrated as comprising smart tag 132. Smart tag 132 may have been affixed, programed, or otherwise configured by a service provider, such that smart tag 132 identifies equipment 106. As an example, smart tag 132 comprises a unique identifier that is associated with an entry in a database. In other examples, smart tag 132 stores configuration information of equipment 106, or may store any of a variety of other information. Smart tag 132 may be active or passive and may communicate with smart tag communicator 130 of client device 104 as described above. Example communications include, but are not limited to, a transmission comprising an associated unique identifier or receiving an indication to provide a visual or audible indication that enables a user to physically identify equipment 106.

Log generation engine 126 generates a set of logs associated with the operation of equipment 106. Example logs include, but are not limited to, startup and/or shutdown logs, software execution logs, uptime statistics, and/or traffic statistics. Thus, it will be appreciated that logs may include key performance indicators (KPIs) associated with equipment 106. In examples, log generation engine 126 transmits at least a part of the generated logs to server device 102 (which may be stored by equipment log data store 118). For example, logs are transmitted automatically, such as after the completion of an event (e.g., after execution of a task, after startup or restarting, etc.) or periodically according to a predetermined amount of time or other schedule, among other examples. As another example, server device 102 requests one or more logs (and/or KPIs therein) from log generation engine 126, such as based on a received issue indication from client device 104 or according to a predetermined schedule, among other examples.

Server device 102 is illustrated as comprising client data processor 110, model generator 112, training data store 114, inventory data store 116, equipment log data store 118, and external data processor 134. Client data processor 110 communicates with client application 120 to perform the troubleshooting, proactive and excess capacity determination, and inventory management aspects described herein. For example, client data processor 110 receives an indication of an issue from client application 120. Accordingly, client data processor 110 generates a set of instructions to instruct a user to capture image data associated with telecommunications equipment (e.g., equipment 106) and/or answer other related questions. It will be appreciated that, in other examples, client application 120 generates at least a part of the instructions locally or may retrieve such instructions from a separate storage location.

Client data processor 110 then receives image data (and, in some examples, metadata) from client application 120. In some examples, client data processor 110 accesses log data associated with equipment 106 from equipment log data store 118. Client data processor 110 processes the data (e.g., according to one or more machine learning models, as may be generated by model generator 112) to determine whether additional information is required, to generate a predicted issue, and/or to determine one or more actions to perform in response to the predicted issue, among other examples. Additional example aspects of client data processor 110 are discussed below with respect to FIG. 1B.

Model generator 112 generates one or more machine learning models based on training data (e.g., as may be stored by training data store 114). For example, training data store 114 comprises tagged image data associated with specific devices offered by the service provider, such that models generated by model generator 112 are trained according to such image data. In some examples, model generator 112 generates a set of different models, where each model is associated with a different type of device or a different service market.

Image data may be added to training data store 114 and used to update an existing model and/or generate a new model. For example, if client data processor 110 applies a model to received image data (e.g., as may be received from client application 120), but determines that the confidence score is below a predetermined threshold, additional information about the equipment may be requested (e.g., from a user of client application 120, from a customer service representative, etc.). The additional information is used to tag the received image data and add the information to training data store 114. In another example, it is determined that the confidence score is within a predetermined range that indicates that the classification is likely correct. As a result, the image data is added to training data store 114 and tagged according to the generated device classification. As such, the machine learning models applied by client data processor 110 adapt according to received image data and improve with use. Although training data store 114 is illustrated as part of server device 102, it will be understood that such training data store 114 may be located on one or more separate devices in a distributed or centralized storage system.

Inventory data store 116 comprises an inventory for a customer of the service provider. In examples, a customer may be associated with multiple inventories, where each inventory is associated with a different location for the customer. An inventory comprises one or more inventory records, where each inventory record is associated with a device. As discussed above, an example inventory record may comprise information associated with the telecommunications equipment, including, but not limited to, a device location, a make, a model, a device status, and/or device configuration information. As another example, the inventory comprises equipment associated with the service provider, while, in other examples, the inventory further comprises equipment associated with one or more other service providers. Inventories and associated inventory records stored in inventory data store 116 are updated by client data processor 110 according to aspects described herein. Although inventory data store 116 is illustrated as part of server device 102, it will be understood that such inventory data store 116 may be located on one or more separate devices in a distributed or centralized storage system.

In another example, external data processor 134 supplements an inventory record stored in inventory data store 116. For example, external data processor 134 may determine an external data source (not pictured) based on an equipment classification associated with an inventory record, and information associated with the equipment classification may be accessed from the determined external data source accordingly. For example, external data processor 134 accesses a website associated with a vendor to retrieve specifications associated with telecommunications equipment, which may then be incorporated into an inventory record in inventory data store 116. In examples, such supplemental information may be cached or accessed from another inventory record in inventory data store 116, such that the external data source need not always be accessed to supplement an inventory record.

Equipment log data store 118 stores logs from equipment, such as equipment 106. For example, the log data in equipment log data store 118 may be periodically received from equipment 106 or may be requested from equipment 106 in response to an issue indication received by client data processor 110, among other examples. Log data may be associated with a specific device (e.g., according to a serial number, a unique identifier, etc.) and/or a customer. Although log data store 118 is illustrated as part of server device 102, it will be understood that such inventory data store 118 may be located on one or more separate devices in a distributed or centralized storage system.

Figure 1B:
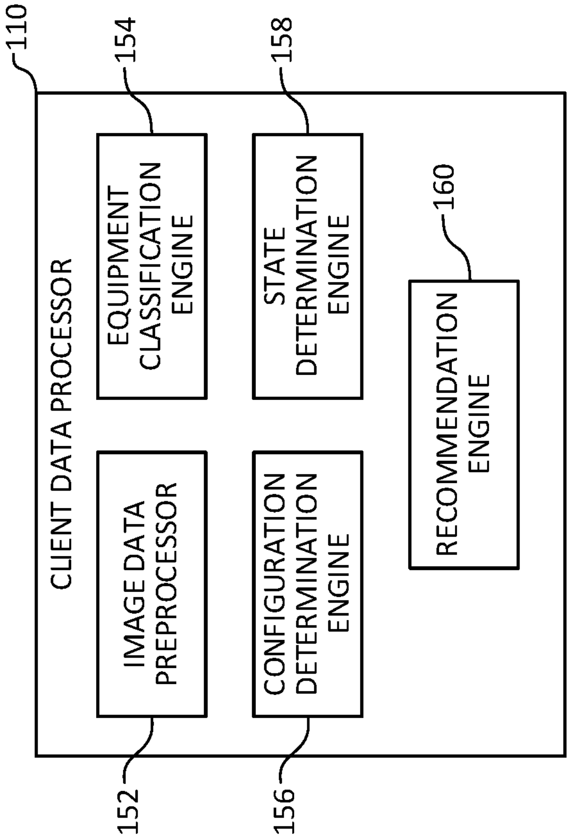
FIG. 1B illustrates an overview of an example client data processor for optical identification of telecommunications equipment.

FIG. 1B illustrates an overview of an example client data processor 110 for optical identification of telecommunications equipment. As illustrated, client data processor 110 comprises image data preprocessor 152, equipment classification engine 154, configuration determination engine 156, state determination engine 158, and recommendation engine 160. As discussed above, client data processor 110 receives image data (and may further receive metadata) from client device 104. In some examples, the image data is received in response to instructions generated by client data processor 110 that indicate a set of images and/or videos that a user of client device 104 should capture.

In examples, the received image data is processed by image data preprocessor 152. For example, image data preprocessor 152 may rotate, crop, and/or scale the received image data. As another example, image data preprocessor 152 adjusts the brightness, contrast, and/or coloration (e.g., generating a black and white representation, a representation having a reduced set of colors, etc.). In some instances, image data preprocessor 152 generates a set of still frames from a video. In other instances, image data preprocessor 152 extracts temperature information, as may be the case when the received image data comprises image data associated with infrared radiation. It will be appreciated that any of a variety of other preprocessing operations may be performed by image data preprocessor 152. Further, in other examples, no preprocessing is performed on the received image data.

Equipment classification engine 154 processes the image data (as may have been processed by image data preprocessor 152) using a machine learning model. In examples, the received metadata is also evaluated by equipment classification engine 154 in conjunction with the image data. As discussed above, the machine learning model may have been generated by model generator 112 according to training data in training data store 114 in FIG. 1A. In examples, equipment classification engine 154 selects a machine learning model from a set of machine learning models. For example, a machine learning model may be associated with a specific device type, service market, and/or service type, among other examples. The selection may be based on the received metadata. As another example, multiple machine learning models are used, where the equipment classification having the highest confidence score is used.

In examples, a confidence score is below a predetermined threshold, such that equipment classification engine 154 determines to request additional information from client application 120. As an example, additional image data (e.g., from different angles, with different lighting, at a higher resolution, etc.) and/or metadata may be requested. In another example, the confidence score is within a predetermined range that indicates the classification is likely correct. Equipment classification engine 154 may add the image data to training data store 114 in FIG. 1A and tag the stored image data according to the generated equipment classification, thereby strengthening the ability of subsequent models to recognize such equipment.

The equipment classification engine 154 may use the generated equipment classification to update a pre-existing inventory record or generate a new inventory record. For example, a pre-existing inventory record is updated according to the equipment classification, the image data, and/or the metadata, thereby updating a device location, a model, a state, or a device configuration, among other examples. In some instances, one or more conflicts are identified and resolved. A conflict may be manually resolved or may be automatically resolved based on an analysis of equipment in the inventory of the customer or based on the metadata, among other considerations. As another example, a new inventory record is created for the classified equipment and stored as part of the inventory for the customer. While service device 102 in FIG. 1A is illustrated as comprising external data processor 134, it will be appreciated that, in other examples, client data processor 110 may comprise external data processor 134, such that an updated or new inventory record may be supplemented with external information according to aspects described herein.

Client data processor 110 further comprises configuration determination engine 156, which determines an equipment configuration for one or more devices that are identified by equipment classification engine 154. In examples, an equipment configuration is determined based on an analysis of the image data to identify one or more other devices to which the equipment is connected. In another example, the image data is evaluated to identify the physical configuration of the equipment itself (e.g., how many ports or slots are in-use, whether certain functionality is installed or otherwise enabled, etc.). In some examples, the evaluation comprises evaluating configuration information stored in an inventory record, as may be stored by inventory data store 116 in FIG. 1A. For example, the inventory record may comprise information regarding which services and/or associated service tiers the equipment is configured to provide.

State determination engine 158 determines an operational state for one or more devices identified by equipment classification engine 154. As an example, state determination engine 158 may identify one or more state rules from a data store and use the identified state rules to determine an operational state accordingly. For example, state rules may be identified based on the equipment classification or based on an indication as to the issue experienced by the customer, among other examples. As discussed above, a state rule may match a dark or illuminated state of one or more LEDs or any of a variety of other indicators, thereby determining the operational state of the device. In some instances, state determination engine 158 accesses log data associated with the telecommunications equipment from equipment log data store 118 in FIG. 1A. Such logs may be accessed according to an associated timestamp or based on the operational state of the telecommunications equipment (as determined above). For example, a first set of logs may be relevant for one operational state, while a second set of logs may be relevant for another operational state. The accessed logs may be generated by a service provider (e.g., by server device 102 in FIG. 1A) and/or by the equipment (e.g., equipment 106).

Recommendation engine 160 of client data processor 110 evaluates the equipment classification generated by equipment classification engine 154, the device configuration generated by configuration determination engine 156, and/or the operational state generated by state determination engine 158 to troubleshoot the telecommunications equipment. For example, recommendation engine 160 identifies one or more troubleshooting rules for the equipment, which are used as described above to evaluate the data and generate one or more predicted issues. A determined predicted issue may have one or more associated actions, or, in another example, recommendation engine 160 queries a database of issues to determine one or more actions associated with the predicted issue.

Accordingly, recommendation engine 160 generates an action based on the predicted issue. Example actions include, but are not limited to, automatically restarting or reconfiguring the device remotely, altering server-side settings, generating a shipping return label, and/or ordering a replacement device. In some examples, troubleshooting instructions are determined for the predicted issue and provided to client application 120 for display to the user. As another example, recommendation engine 160 provides an indication to client application 120 that instructs client application 120 to connect to a customer support representative (e.g., via a telephone call, a text-based or video chat session, etc.). While example troubleshooting techniques and associated actions are described herein, it will be appreciated that a variety of other techniques may be used without departing from the present disclosure.

In other examples, recommendation engine 160 evaluates a proactive rule to determine whether telecommunications equipment should be proactively replaced. For example, a proactive rule may comprise criteria that is indicative of decreased device performance or imminent failure. As another example, a proactive rule may comprise a set of equipment that is being phased out or has been marked obsolete by the service provider. In other instances, recommendation engine 160 identifies excess capacity associated with telecommunications equipment, such that an action may be generated in response to identifying the excess capacity. Example actions include, but are not limited to, generating a service ticket to replace the telecommunications equipment with replacement telecommunication equipment (e.g., that reduces capacity to be closer to current or anticipated utilization) or providing an indication (e.g., to a customer, to a sales representative) of one or more potential services offered by the service provider.

Figure 1C:
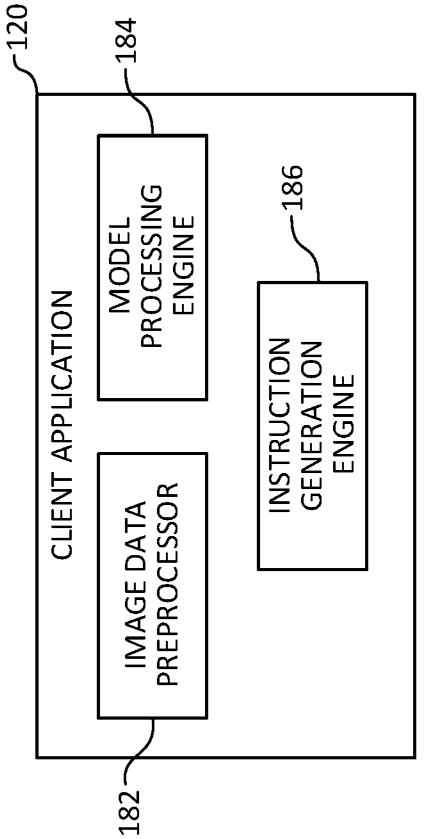
FIG. 1C illustrates an overview of an example client application for optical identification of telecommunications equipment.

FIG. 1C illustrates an overview of an example client application 120 for optical identification of telecommunications equipment. As illustrated, client application 120 comprises image data preprocessor 182, model processing engine 184, and instruction generation engine 186. In examples, model processing engine 184 of client application 120 uses a machine learning model that is trained to perform more general classification (e.g., as compared to client data processor 110 of server device 102 in FIGS. 1A and 1B), such as determining whether the telecommunications equipment is associated with a specific vendor, computing functionality, and/or service provider. Accordingly, image data preprocessor 182 may perform similar aspects as image data processor 152 described above to preprocess image data prior to processing by model processing engine 184. Model processing engine 184 may also utilize metadata (e.g., a geographic location gathered by geolocation engine 124 in FIG. 1A, information from a smart tag collected by smart tag communicator 130, etc.) to determine whether client device 104 is at the correct location, is proximate to equipment 106, and/or that smart tag 132 of equipment 106 has a correct identifier (e.g., as may be specified by a service ticket).

Instruction generation engine 186 may generate instructions to the user according to aspects described herein, which may be generated based on one or more determinations of model processing engine 184 and/or as may be received from client data processor 110 of server device 102 in FIGS. 1A and 1B. Example instructions include, but are not limited to, image capture instructions or instructions to scan or otherwise interact with a smart tag. In some examples, instruction generation engine 186 generates an augmented reality representation of received image data, in which one or more regions of the image data are highlighted in order to direct the user's attention to such regions. For example, the user may be instructed to capture additional information of a highlighted region. Thus, client application 102 may generate determinations that are relevant to customer service and/or performing a service call, whereas server device 102 performs more in-depth processing to generate or update an inventory record, among other examples.

Figure 2A:
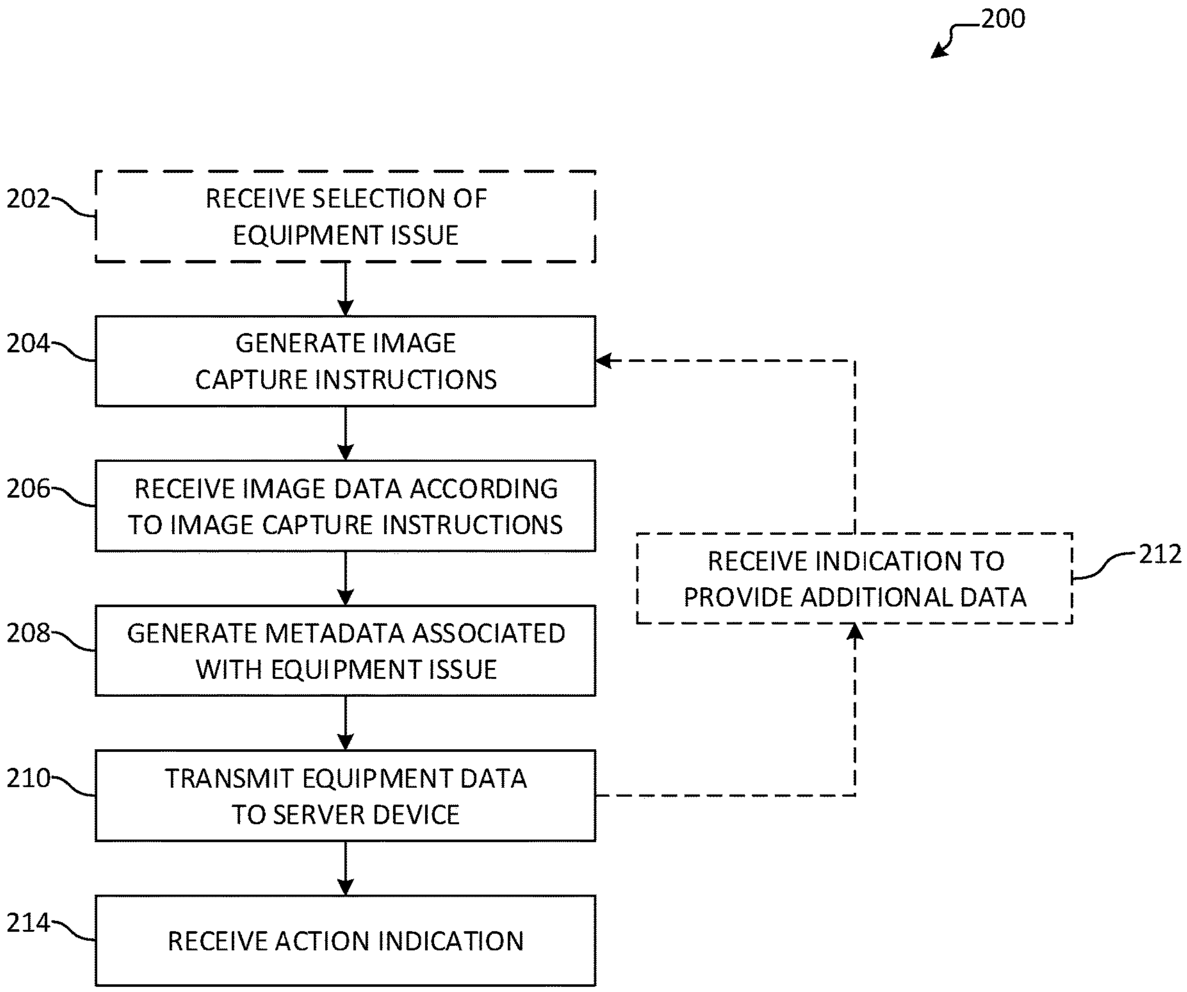
FIG. 2A illustrates an overview of an example method for aspects of optical identification of telecommunications equipment at a client to facilitate customer service.

FIG. 2A illustrates an overview of an example method 200 for aspects of optical identification of telecommunications equipment at a client to facilitate customer service. In examples, aspects of method 200 are performed by a client, such as client application 120 on client device 104 discussed above with respect to FIGS. 1A-IC. In an example, aspects of method 200 are performed while a user is waiting to speak with a customer service representative, thereby collecting relevant diagnostic information that can be used by the customer service representative to troubleshoot the issue that the user is experiencing. Further, if the issue is automatically diagnosed and/or resolved, the user need not wait for a customer service representative to become available.

In some examples, method 200 begins at operation 202, where a selection of an equipment issue is received. As an example, a graphical display is presented on the client device, comprising a list of possible issues. In some examples, a menu and one or more submenus are used to enable the user to select an equipment issue (e.g., a first menu of equipment types, a submenu of issue types, and another submenu of one or more issue). In another example, a set of graphical icons are used, or one or more text fields are provided in which the user can enter a textual description of the problem. It will be appreciated that a variety of other techniques may be used to enable a user to describe the issue being experienced. Operation 202 is illustrated using a dashed box to indicate that, in other examples, operation 202 is omitted (e.g., the user need not necessarily specify an issue) and method 200 begins at operation 204 instead.

At operation 204, image capture instructions are generated. In examples, image capture instructions are generated locally on the device (e.g., by instruction generation engine 186 of client application 120 in FIG. 1C). In some instances, the generated instructions are determined based on the issue selected at operation 202. In other examples, an indication of the issue selected at operation 202 is sent to a server device (e.g., server device 102 in FIG. 1A) and image capture instructions are received in response. In some examples, the image capture instructions are presented as a series of steps (e.g., either by voice or display), where the first step is presented to a user and the user captures a first image according to the first step. Accordingly, after the first image is captured (and, in some instances, verified to confirm it contains a device), the second step is presented. Thus, the user progresses through each step, capturing image data as instructed along the way. In another example, a list is presented to the user, after which the user captures the entire set of indicated image data.

It will be appreciated that a variety of other techniques may be used to present instructions to a user. For example, one or more overlays may be used to indicate a device shape, type, or location to the user, thereby assisting the user in capturing the image data. In such an example, the overlay may be generated using an on-device model, which may be selected based on the equipment issue selected at operation 202 (e.g., based on a device that is expected to have caused the issue) or based on an inventory record or an associated inventory (e.g., as may be stored by an inventory data store, such as inventory data store 116 in FIG. 1A). In examples, the on-device model is received from the server device as part of received image capture instructions.

Flow progresses to operation 206, where image data is received according to the image capture instructions. For example, an image capture device (e.g., image capture device 122 in FIG. 1A) is used to capture images, videos, and/or video streams accordingly. In some instances, additional information is embedded in the image data, including, but not limited to, a focal length, depth information, a timestamp, and/or a geographic location (e.g., as may be generated by a geolocation engine, such as geolocation engine 124 in FIG. 1A).

At operation 208, metadata associated with the selected equipment issue is generated. For example, if the captured image data does not comprise a geographic location, a geographic location may be determined at operation 208. In another example, one or more questions are presented to the user, such that the user enters additional information in response. Example questions include, but are not limited to, an estimated installation date of the equipment, visible markings associated with the equipment (e.g., a model number, a manufacturer name, handwritten notes on the equipment or associated wiring, etc.), and/or more specific location information (e.g., a building floor, a room or building number, etc.). As a further example, information from a smart tag may be acquired.

Moving to operation 210, equipment data comprising at least the captured image data and the generated metadata is transmitted to a server device (e.g., server device 102 in FIG. 1A), where it is processed using one or more machine learning models according to aspects described herein. In some examples, flow progresses to operation 212, where an indication is received to provide additional data. Such an indication may be received when telecommunications equipment is not identified within the captured image data or when a confidence score generated by a machine learning model is below a predetermined threshold.

As a result, flow again loops through operations 204-210, such that image capture instructions may be generated and presented. In some examples, the indication received at operation 212 comprises a new set of image capture instructions that are presented at operation 204. The indication may also cause additional metadata to be requested. In some examples, only a subset of operations 204-210 are performed. For example, if the confidence score generated at the server device is within a predetermined range that indicates the equipment classification is likely correct, operations 204 and 206 may be omitted. Rather, in such instances, the metadata generated at operation 208 may comprise a request that the user confirm that the equipment classification is correct.

Operation 212 is illustrated using a dashed box to indicate that, in other examples, flow instead progresses from operation 210 to operation 214 without performing operations 212 and 204-210. As such, flow eventually arrives at operation 214, where an action indication is received from the server device. Example action indications include, but are not limited to, an indication that a device is being automatically repaired or an indication that a warranty replacement will be made (e.g., comprising return instructions, a shipping return label, etc.). In some examples, the action indication comprises troubleshooting instructions that are displayed or otherwise provided to the user. As another example, the action indication instructs the client to connect to a customer support representative or to continue to wait for an available customer service representative. While example troubleshooting techniques and associated actions are described herein, it will be appreciated that a variety of other techniques and actions may be used without departing from the present disclosure. Flow terminates at operation 214.

Figure 2B:
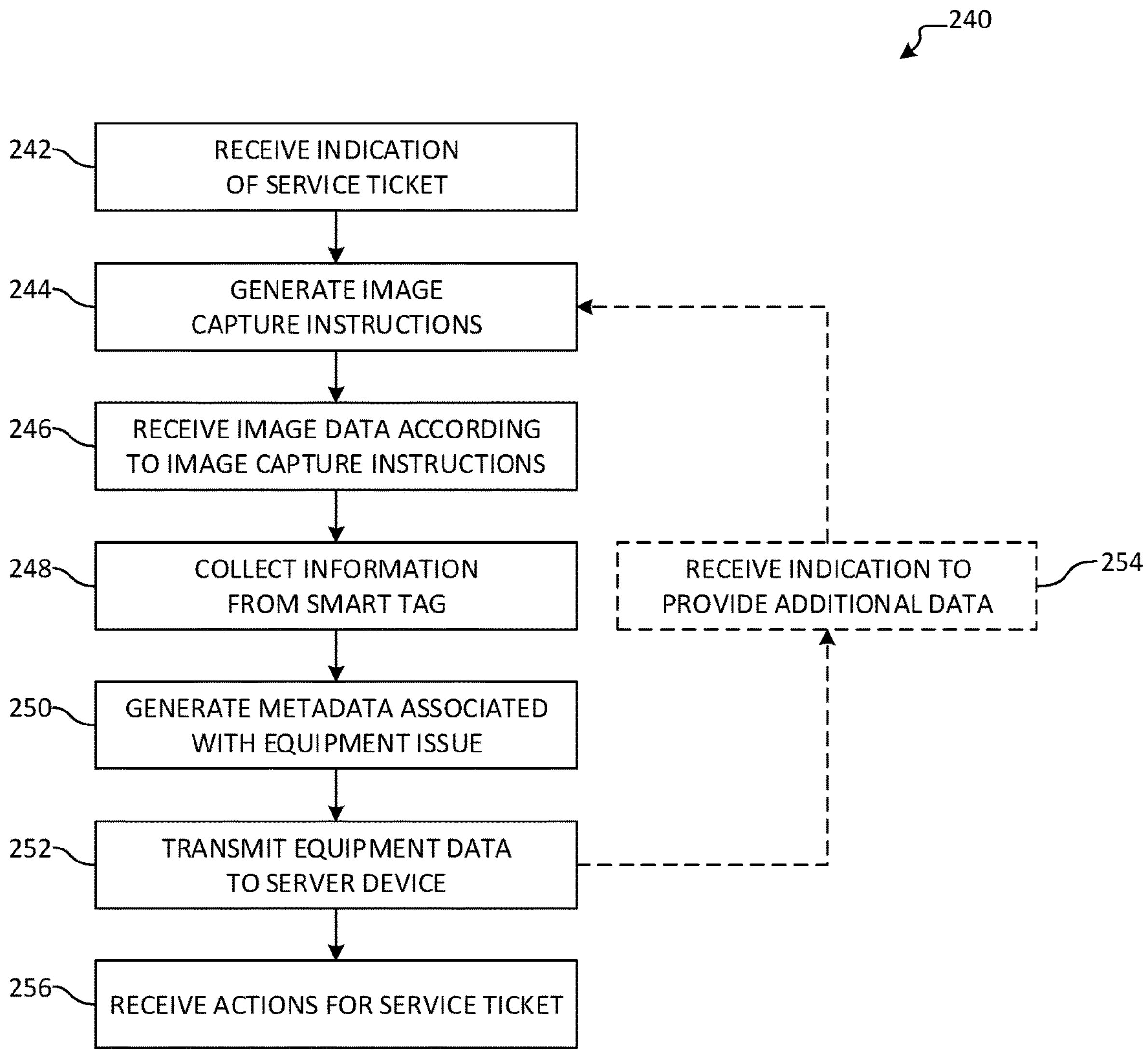
FIG. 2B illustrates an overview of another example method for aspects of optical identification of telecommunications equipment at a client for a service visit by a service technician.

FIG. 2B illustrates an overview of another example method 240 for aspects of optical identification of telecommunications equipment at a client for a service visit by a service technician. In examples, aspects of method 240 are performed by a client, such as client application 120 on client device 104 discussed above with respect to FIGS. 1A-1C. In an example, aspects of method 240 are performed by a service technician of a service provider. Accordingly, method 240 may enable the proactive resolution of current or future issues and may enable a service technician to perform tasks with reduced or eliminated training requirements.

Method 240 begins at operation 242, where an indication of a service ticket is received. The indication may be received from a server device, such as server device 102 in FIG. 1A. In examples, the indication comprises a set of telecommunications equipment that is the subject of the service ticket. The service ticket may comprise one or more issues associated with the set of telecommunication equipment and one or more actions to be performed by a service technician in order to resolve the issues.

At operation 244, image capture instructions are generated. In examples, image capture instructions are generated locally on the device (e.g., by instruction generation engine 186 of client application 120 in FIG. 1C). In some instances, the generated instructions are determined based on the indication that was received at operation 242. In other examples, image capture instructions are received as part of the indication at operation 242. In some examples, the image capture instructions are presented as a series of steps (e.g., either by voice or display), where the first step is presented to a user and the user captures a first image according to the first step. Accordingly, after the first image is captured (and, in some instances, verified to confirm it contains a device), the second step is presented. Thus, the user progresses through each step, capturing image data as instructed along the way. In another example, a list is presented to the user, after which the user captures the entire set of indicated image data.

It will be appreciated that a variety of other techniques may be used to present instructions to a user. For example, one or more overlays may be used to indicate a device shape, type, or location to the user, thereby assisting the user in capturing the image data. In such an example, the overlay may be generated using an on-device model, which may be selected based on the set of telecommunications equipment that was received at operation 202. In examples, the on-device model is received from the server device as part of received image capture instructions.

Flow progresses to operation 246, where image data is received according to the image capture instructions. For example, an image capture device (e.g., image capture device 122 in FIG. 1A) is used to capture images, videos, and/or video streams accordingly. In some instances, additional information is embedded in the image data, including, but not limited to, a focal length, depth information, a timestamp, and/or a geographic location (e.g., as may be generated by a geolocation engine, such as geolocation engine 124 in FIG. 1A).

At operation 248, information is collected from a smart tag (e.g., smart tag 132 of equipment 106 in FIG. 1A). In examples, the instructions generated at operation 244 further comprise instructions for collecting information from a smart tag, such that a user is directed to move the device to a certain region of telecommunications equipment or to identify a visual or audible indication, among other examples. Accordingly, information is collected from the smart tag (e.g., using a smart tag communicator, such as smart tag communicator 130 of client device 104 in FIG. 1A). As discussed above, example smart tag information comprises, but is not limited to, a unique identifier or configuration information associated with the telecommunications equipment. In some examples, operation 248 is omitted.

Flow progresses to operation 250, where metadata associated with the selected equipment issue is generated. For example, if the captured image data does not comprise a geographic location, a geographic location may be determined at operation 250. In another example, one or more questions are presented to the user, such that the user enters additional information in response. Example questions include, but are not limited to, an estimated installation date of the equipment, visible markings associated with the equipment (e.g., a model number, a manufacturer name, handwritten notes on the equipment or associated wiring, etc.), and/or more specific location information (e.g., a building floor, a room or building number, etc.). Information collected from a smart tag at operation 248 may be included in the metadata generated at operation 250.

Moving to operation 252, equipment data comprising at least the captured image data and the generated metadata is transmitted to a server device (e.g., server device 102 in FIG. 1A), where it is processed using one or more machine learning models according to aspects described herein. In some examples, flow progresses to operation 254, where an indication is received to provide additional data. Such an indication may be received when telecommunications equipment is not identified within the captured image data or when a confidence score generated by a machine learning model is below a predetermined threshold.

As a result, flow again loops through operations 244-252, such that image capture instructions may be generated and presented. In some examples, the indication received at operation 254 comprises a new set of image capture instructions that are presented at operation 244. The indication may also cause additional metadata to be requested. In some examples, only a subset of operations 244-252 are performed. For example, if the confidence score generated at the server device is within a predetermined range that indicates the equipment classification is likely correct, operations 244, 246, and/or 248 may be omitted. Rather, in such instances, the metadata generated at operation 250 may comprise a request that the user confirm that the equipment classification is correct.

Operation 254 is illustrated using a dashed box to indicate that, in other examples, flow instead progresses from operation 252 to operation 256 without performing operations 254 and 244-252. As such, flow eventually arrives at operation 256, where a set of actions for a service ticket is received from the server device. Example actions include, but are not limited to, altering a device configuration, replacing or rerouting cabling, and/or replacing telecommunication equipment. In some examples, operation 256 comprises an indication to proceed with a set of actions that was received at operation 242, which may remain unchanged. In other examples, a new set of actions is received or an existing set of actions may be updated to include additional, alternative, or fewer instructions, as may be the case when a different issue is identified based on the optical identification techniques described herein. In some examples, additional telecommunications equipment may be included in the service ticket as a result of performing operations 244-254, as may be the case when a proactive rule is matched, additional telecommunications equipment is identified to have an issue, and/or when excess capacity is identified, among other examples. While example actions are described herein, it will be appreciated that a variety of other techniques and actions may be used without departing from the present disclosure. Flow terminates at operation 256.

Figure 3A:
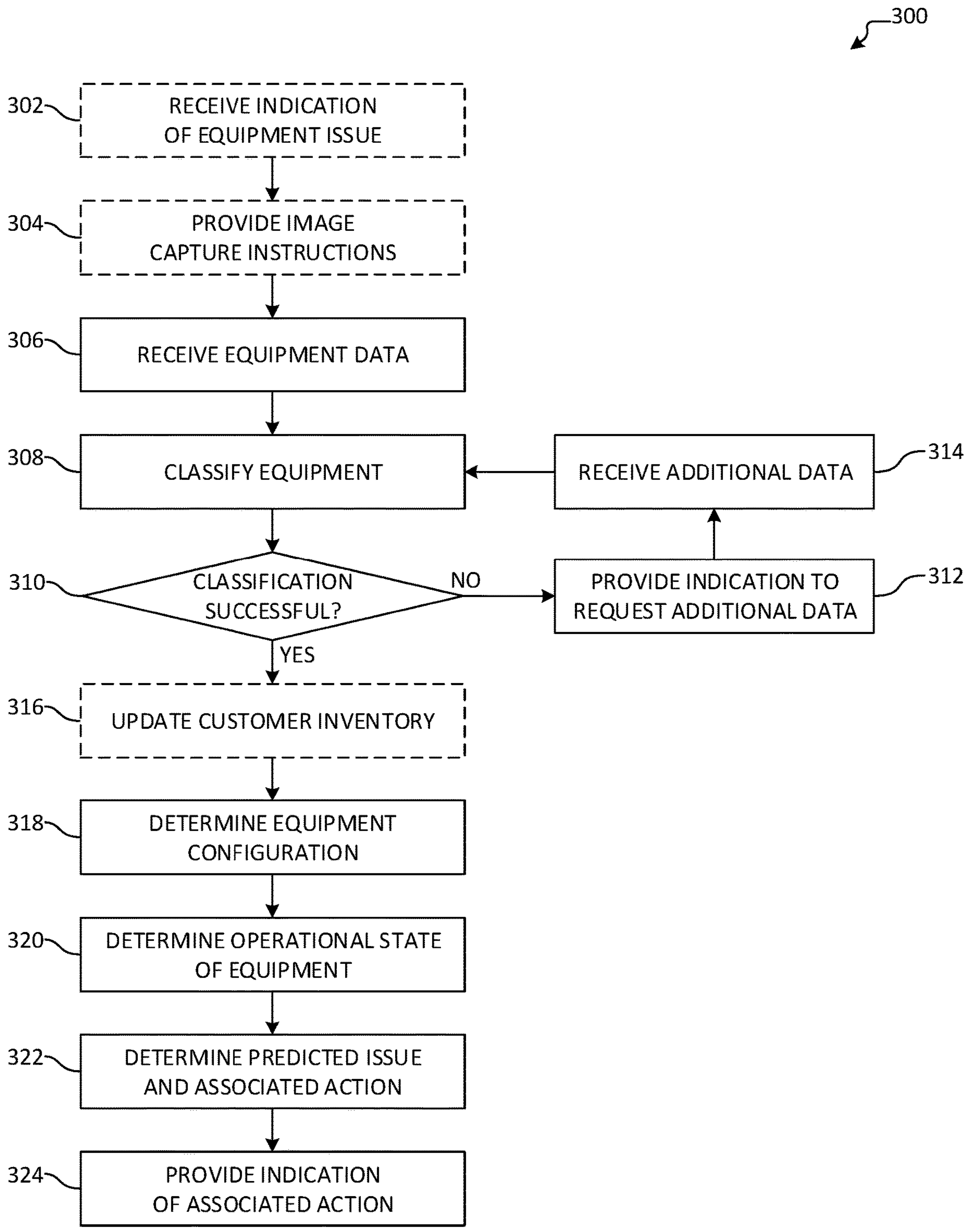
FIG. 3A illustrates an overview of an example method for processing an indication of an equipment issue from a client to generate an action indication accordingly.

FIG. 3A illustrates an overview of an example method 300 for processing an indication of an equipment issue from a client to generate an action indication accordingly. In examples, aspects of method 300 are performed by one or more server devices associated with a service provider, such as server device 102 in FIG. 1A. The server device may communicate with a client device, such as client device 104 in FIG. 1A, which may perform aspects of method 200 in FIG. 2A described above.

In examples, method 300 begins at operation 302, where an indication of an equipment issue is received. The indication may be received from a client, such as client device 104/client application 120 in FIG. 1A. As an example, the indication is received as a result of a user selecting or otherwise describing an issue at the client, as discussed above with respect to operation 202 in method 200 of FIG. 2A. The indication may comprise one or more selections from a list of possible issues or, as another example, the indication comprises a textual description of the problem. In such instances, the textual description may be processed using keyword matching or natural language understanding techniques, among other examples. It will be appreciated that the indication may comprise a variety of other types of information.

Moving to operation 304, image capture instructions are provided in response to the received indication. The image capture instructions may be determined based on the received issue indication. In some examples, the determination additionally or alternatively comprises an analysis of an inventory record associated with the client device. As another example, the image capture instructions may be determined based on how one or more models were trained (e.g., according to a neural network type, what training data was used, etc.). The provided image capture instructions may be received at operation 204, as was discussed above with respect to FIG. 2A.

In some examples, the image capture instructions are provided along with one or more machine learning models, which may be used by the client device to perform the augmented reality aspects described herein. In other examples, the image capture instructions comprise an identifier or other information associated with a service tag, which may be used by the client device to identify or otherwise interact with (e.g., activate a visual or audible indicator, etc.) a service tag associated with telecommunications equipment. Operations 302 and 304 are illustrated using dashed boxes to indicate that one or both operations may be omitted. For example, image capture instructions may be provided without first receiving an issue indication or, as another example, no image capture instructions may be provided to the client device (e.g., where the client device generates its own image capture instructions and/or another device provides such instructions) and method 300 may instead start at operation 306.

At operation 306, equipment data is received from a client device. The equipment data may be received by a client data processor, such as client data processor 110 in FIGS. 1A and 1B. According to aspects described herein, the equipment data comprises image data and/or metadata. In examples where operation 302 is not performed, the equipment data may further comprise an issue indication according to aspects described herein. The equipment data may have been generated as a result of a client performing aspects of method 200, where such data is generated at the client device and transmitted to a server device at operation 210.

Flow progresses to operation 308, where the equipment data is used to classify telecommunications equipment therein. In examples, aspects of operation 308 are performed by an equipment classification engine, such as equipment classification engine 154 in FIG. 1B. For example, a machine learning model is used to process constituent image data. In some examples, the image data is preprocessed, as may be performed by an image data preprocessor (e.g., image data preprocessor 152 in FIG. 1B). The machine learning model may have been generated by a model generator according to training data, such as model generator 112 using training data in training data store 114, as discussed above with respect to FIG. 1A.

In examples, a machine learning model is selected from a set of machine learning models. For example, a machine learning model may be associated with a specific device type, service market, and/or service type, among other examples. As another example, multiple machine learning models are used, where the equipment classification having the highest confidence score is selected. In some examples, metadata received as part of the equipment data is also analyzed at operation 308 to classify the equipment. For example, the metadata may be analyzed in combination with the image data by the same machine learning model or another machine learning model may be used. As another example, the metadata received as part of the equipment data may be used to select a machine learning model or to decide between multiple potential equipment classifications.

At determination 310, it is determined whether device classification at operation 308 was successful. In examples, the determination comprises evaluating one or more confidence scores, as may be generated by the machine learning model(s) applied at operation 308. A confidence score may be compared to a predetermined threshold and/or range. For example, if the confidence score is above a threshold or within a range, it may be determined that classification was successful. As another example, if the confidence score is below a threshold, it may be determined that classification was unsuccessful. In some examples, a range is used to determine when classification is likely successful, but the confidence score may not be high enough to definitively determine that the equipment classification was successful. In such instances, training data may be updated using the image data as described above, thereby causing resulting models to better recognize such telecommunications equipment in the future. In some instances, the metadata received as part of the equipment data may be used to validate the equipment classification generated by the machine learning model.

If, at determination 310, it is determined that classification was not successful, flow branches "NO" to operation 312, where an indication is provided to request additional data. In examples, the indication comprises image capture instructions, prompts, or another indication of a type of additional data that is requested. Such an indication may be provided to a client performing operation 212, discussed above with respect to method 200 in FIG. 2A. Flow progresses to operation 314, where the additional data is received. Accordingly, flow returns to operation 308 and determination 310, where the additional data is used to classify the equipment. In examples, the additional data is analyzed separately or in combination with the equipment data that was previously received at operation 306. Flow eventually progresses to operation 316, which is discussed below.

If, however, it is determined at operation 310 that classification was successful, flow branches "YES" to operation 316, where a customer inventory is updated. In examples, the inventory is stored in an inventory data store, such as inventory data store 116 in FIG. 1A. As noted above, the inventory comprises an inventory record for each device associated with the customer. For example, a pre-existing inventory record is updated according to the equipment classification, the image data, and/or the metadata, thereby updating a device location, a model, a state, or a device configuration, among other examples. In some instances, one or more conflicts are identified and resolved. A conflict may be manually resolved or may be automatically resolved based on an analysis of equipment in the inventory of the customer or based on the metadata, among other considerations. As another example, a new inventory record is created for the classified equipment and stored as part of the inventory for the customer.

In examples, operation 316 further comprises supplementing the inventory record with information from one or more external data sources (e.g., as may be performed by an external data processor, such as external data processor 134 in FIG. 1A). An external data source may be determined based on the equipment classification (e.g., as was determined at operation 308) and information associated with the equipment classification may be accessed from the determined external data source accordingly. In examples, such supplemental information may be accessed from a cache or from another inventory record, such that the external data source need not always be accessed to supplement an inventory record. Operation 316 is illustrated using a dashed box to indicate that, in some examples, operation 316 may be omitted. In some examples, method 300 may terminate at operation 316, such as instances where the aspects described herein are used to update an inventory of a customer without performing such subsequent troubleshooting.

Flow progresses to operation 318, where equipment configuration is determined. In examples, the equipment configuration is determined by a configuration determination engine, such as configuration determination engine 156 in FIG. 1B. For example, the equipment configuration is determined based on an analysis of the image data to identify one or more other devices to which the classified equipment is connected. As another example, the image data is evaluated to identify the physical configuration of the equipment itself (e.g., how many ports or slots are in-use, whether certain functionality is installed or otherwise enabled, etc.). In some examples, the evaluation comprises evaluating configuration information stored in an inventory record, as may be stored by inventory data store 116 in FIG. 1A. For example, the inventory record may comprise information regarding which services and/or associated service tiers the equipment is configured to provide. It will be appreciated that other techniques and a variety of computer vision techniques may be used to determine an equipment configuration according to aspects described herein.

Moving to operation 320, an operational state is determined for the equipment. In an example, the operational state is determined by a state determination engine, such as state determination engine 158. Operation 320 may comprise identifying one or more state rules from a data store. For example, the state rules may be identified based on the equipment classification (e.g., as was generated at operation 308) or based on an indication as to the issue experienced by the customer (e.g., as may be received at operations 302, 306, and/or 314), among other examples. As described herein, image data may be processed according to a state rule in order to match a dark or illuminated state of one or more LEDs or any of a variety of other indicators, thereby determining the operational state of the device.

In some instances, log data is accessed and evaluated according to a state rule. The log data may be stored by an equipment log data store of a server device, such as equipment log data store 118 of server device 102 in FIG. 1A. In another example, log data is requested from the device itself. In examples, the log data is identified based at least in part on the equipment classification and/or the operational state of the telecommunications equipment, as well as received metadata and/or any issue indications (e.g., as may have been received at operations 302, 306, and/or 314). For example, a first set of logs may be relevant for one operational state, while a second set of logs may be relevant for another operational state.

At operation 322, a predicted issue and an associated action are determined. In examples, aspects of operation 322 are performed by a recommendation engine, such as recommendation engine 160 in FIG. 1B. As an example, the equipment classification (e.g., from operation 308), the device configuration (e.g., from operation 318), and/or the operational state (e.g., from operation 320) is processed to troubleshoot the telecommunications equipment. One or more troubleshooting rules may be identified for the equipment. As described above, a troubleshooting rule may comprise a flow chart having a series of decision points, each of which evaluates at least a part of the equipment classification, device configuration, and/or operational state. Ultimately, evaluation of a troubleshooting rule yields a determination of one or more predicted issues. Accordingly, a determined predicted issue may have one or more actions associated with it, or, in another example, a database of issues is queried to determine one or more actions associated with the predicted issue.

Flow progresses to operation 324, where an indication of one or more determined actions is provided to the client device. Example action indications include, but are not limited to, an indication that a device is being automatically repaired or an indication that a warranty replacement will be made (e.g., comprising return instructions, a shipping return label, etc.). In some examples, the action indication comprises troubleshooting instructions (e.g., which may have been determined at operation 322) that are provided for display or otherwise communicated to the user. As another example, the action indication instructs the client to connect to a customer support representative or to continue to wait for an available customer service representative. Flow terminates at operation 324.

Figure 3B:
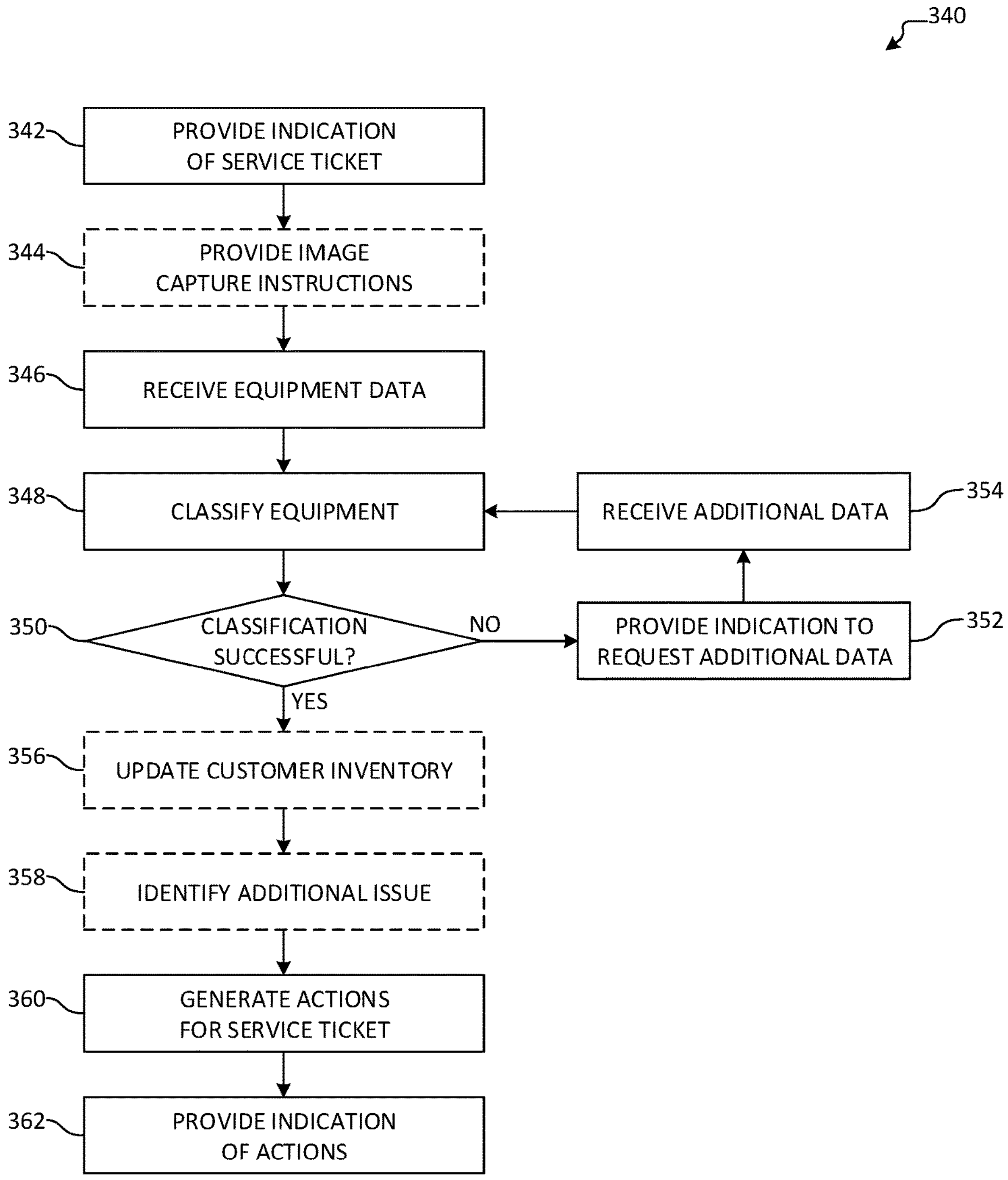
FIG. 3B illustrates an overview of an example method for processing a service ticket and generating actions for a service ticket according to aspects described herein.

FIG. 3B illustrates an overview of an example method 340 for processing a service ticket and generating actions for a service ticket according to aspects described herein. In examples, aspects of method 340 are performed by one or more server devices associated with a service provider, such as server device 102 in FIG. 1A. The server device may communicate with a client device, such as client device 104 in FIG. 1A, which may perform aspects of method 240 in FIG. 2B described above.

In examples, method 340 begins at operation 342, where an indication of a service ticket is provided to a client. In examples, the indication comprises a set of telecommunications equipment that is the subject of the service ticket. The service ticket may comprise one or more issues associated with the set of telecommunication equipment and one or more actions to be performed by a service technician in order to resolve the issues. In examples, the service ticket is accessed from a database of service tickets.

Moving to operation 344, image capture instructions are provided to the client. The image capture instructions may be determined based on the service ticket (e.g., associated telecommunications equipment, actions, etc.). In some examples, the determination additionally or alternatively comprises an analysis of an inventory record associated with the client device. As another example, the image capture instructions may be determined based on how one or more models were trained (e.g., according to a neural network type, what training data was used, etc.). The provided image capture instructions may be received at operation 244, as was discussed above with respect to FIG. 2B.

In some examples, the image capture instructions are provided along with one or more machine learning models, which may be used by the client device to perform the augmented reality aspects described herein. In other examples, the image capture instructions comprise an identifier or other information associated with a service tag, which may be used by the client device to identify or otherwise interact with (e.g., activate a visual or audible indicator, etc.) a service tag associated with telecommunications equipment. Operation 344 is illustrated using a dashed box to indicate it may be omitted. For example, no image capture instructions may be provided to the client device (e.g., where the client device generates its own image capture instructions and/or another device provides such instructions).

At operation 346, equipment data is received from a client device. The equipment data may be received by a client data processor, such as client data processor 110 in FIGS. 1A and 1B. According to aspects described herein, the equipment data comprises image data and/or metadata. The equipment data may have been generated as a result of a client performing aspects of method 240, where such data is generated at the client device and transmitted to a server device at operation 252.

Flow progresses to operation 348, where the equipment data is used to classify telecommunications equipment therein. In examples, aspects of operation 348 are performed by an equipment classification engine, such as equipment classification engine 154 in FIG. 1B. For example, a machine learning model is used to process constituent image data. In some examples, the image data is preprocessed, as may be performed by an image data preprocessor (e.g., image data preprocessor 152 in FIG. 1B). The machine learning model may have been generated by a model generator according to training data, such as model generator 112 using training data in training data store 114, as discussed above with respect to FIG. 1A.

In examples, a machine learning model is selected from a set of machine learning models. For example, a machine learning model may be associated with a specific device type, service market, and/or service type, among other examples. As another example, multiple machine learning models are used, where the equipment classification having the highest confidence score is selected. In some examples, metadata received as part of the equipment data is also analyzed at operation 348 to classify the equipment. For example, the metadata may be analyzed in combination with the image data by the same machine learning model or another machine learning model may be used. As another example, the metadata received as part of the equipment data may be used to select a machine learning model or to decide between multiple potential equipment classifications.

At determination 350, it is determined whether device classification at operation 348 was successful. In examples, the determination comprises evaluating one or more confidence scores, as may be generated by the machine learning model(s) applied at operation 348. A confidence score may be compared to a predetermined threshold and/or range. For example, if the confidence score is above a threshold or within a range, it may be determined that classification was successful. As another example, if the confidence score is below a threshold, it may be determined that classification was unsuccessful. In some examples, a range is used to determine when classification is likely successful, but the confidence score may not be high enough to definitively determine that the equipment classification was successful. In such instances, training data may be updated using the image data as described above, thereby causing resulting models to better recognize such telecommunications equipment in the future. In some instances, the metadata received as part of the equipment data may be used to validate the equipment classification generated by the machine learning model.

If, at determination 350, it is determined that classification was not successful, flow branches "NO" to operation 352, where an indication is provided to request additional data. In examples, the indication comprises image capture instructions, prompts, or another indication of a type of additional data that is requested. Such an indication may be provided to a client performing operation 254, discussed above with respect to method 240 in FIG. 2B. Flow progresses to operation 354, where the additional data is received. Accordingly, flow returns to operation 348 and determination 350, where the additional data is used to classify the equipment. In examples, the additional data is analyzed separately or in combination with the equipment data that was previously received at operation 346. Flow eventually progresses to operation 356, which is discussed below.

If, however, it is determined at operation 350 that classification was successful, flow branches "YES" to operation 356, where a customer inventory is updated. In examples, the inventory is stored in an inventory data store, such as inventory data store 116 in FIG. 1A. As noted above, the inventory comprises an inventory record for each device associated with the customer. For example, a pre-existing inventory record is updated according to the equipment classification, the image data, and/or the metadata, thereby updating a device location, a model, a state, or a device configuration, among other examples. In some instances, one or more conflicts are identified and resolved. A conflict may be manually resolved or may be automatically resolved based on an analysis of equipment in the inventory of the customer or based on the metadata, among other considerations. As another example, a new inventory record is created for the classified equipment and stored as part of the inventory for the customer.

In examples, operation 356 further comprises supplementing the inventory record with information from one or more external data sources (e.g., as may be performed by an external data processor, such as external data processor 134 in FIG. 1A). An external data source may be determined based on the equipment classification (e.g., as was determined at operation 348) and information associated with the equipment classification may be accessed from the determined external data source accordingly. In examples, such supplemental information may be accessed from a cache or from another inventory record, such that the external data source need not always be accessed to supplement an inventory record. Operation 356 is illustrated using a dashed box to indicate that, in some examples, operation 356 may be omitted (e.g., when customer inventory need not be updated).

At operation 358, an additional issue is identified. Operation 358 is illustrated using a dash box to indicate that, in other examples, operation 358 may be omitted. For example, a proactive determination may be made that identifies telecommunications equipment that does not currently exhibit an issue, but should be proactively replaced or reconfigured. Such aspects of operation 358 may comprise evaluating one or more proactive rules. For example, a proactive rule may comprise criteria that is indicative of decreased device performance or imminent failure. As another example, a proactive rule may comprise a set of equipment that is being phased out or has been marked obsolete by the service provider. In other aspects, the optical identification techniques described herein may identify an issue associated with other telecommunications equipment depicted in the image data. Accordingly, an additional issue is identified, such that one or more actions may be taken on associated telecommunications equipment that satisfies a proactive rule or is determined to exhibit an issue, among other examples.

As another example, operation 358 may comprise identifying excess capacity associated with telecommunications equipment. For example, physical configuration of the telecommunications equipment may be evaluated to determine whether additional capacity exists. Examples of additional capacity include, but are not limited to, an unused port of a network card or network device or an empty expansion slot. Excess capacity may be identified via an indirect indicator (e.g., an indicator light associated with a port that is unlit) and/or a direct indicator (e.g., the empty port itself). Thus, excess capacity may also be an additional issue that is identified at operation 358.

At operation 360, a set of actions is generated for the service ticket and for additional issues that were generated at operation 358. In examples, aspects of operation 360 are performed by a recommendation engine, such as recommendation engine 160 in FIG. 1B. As an example, the equipment classification (e.g., from operation 348), a device configuration, and/or an operational state are processed to troubleshoot an issue indicated by the service ticket. One or more troubleshooting rules may be identified for the equipment. As described above, a troubleshooting rule may comprise a flow chart having a series of decision points, each of which evaluates at least a part of the equipment classification, device configuration, and/or operational state. Ultimately, evaluation of a troubleshooting rule yields a set of associated actions as described above. As another example, a database of issues may be queried to determine one or more actions associated with the issue. The set of actions generated may further comprise one or more actions for an additional issue that was identified at operation 358.

Flow progresses to operation 362, where an indication of one or more determined actions is provided to the client device. Example action indications include, but are not limited to, an indication that a device is being automatically repaired or an indication that a warranty replacement will be made (e.g., comprising return instructions, a shipping return label, etc.). As another example, the action indication instructs a user of the client (e.g., a service technician) to alter a device configuration, replace or reroute cabling, and/or replace telecommunication equipment (e.g., to take proactive action or to address identified excess capacity, among other examples). While example actions are described herein, it will be appreciated that a variety of other techniques and actions may be used without departing from the present disclosure. Flow terminates at operation 362.

Figure 3C:
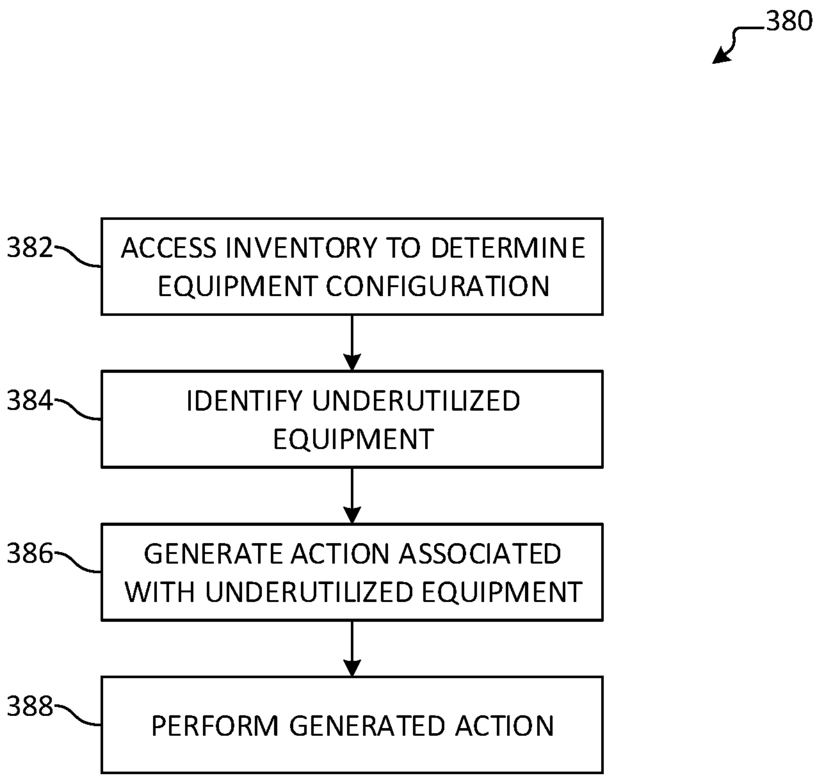
FIG. 3C illustrates an overview of an example method for identifying underutilized equipment and performing an action accordingly.

FIG. 3C illustrates an overview of an example method 380 for identifying underutilized equipment and performing an action accordingly. In examples, aspects of method 380 are performed periodically or as image data is received from a client (e.g., as part of operations 316 or 356 of methods 300 and 340 in FIGS. 3A and 3B, respectively).

Method 380 begins at operation 382, where an inventory is accessed to determine equipment configuration. In examples, the inventory is accessed from an inventory data store, such as inventory data store 116 in FIG. 1A. As another example, the inventory is accessed from an inventory record that is being updated or created, as discussed above with respect to methods 300 or 340 in FIGS. 3A and 3B, respectively.

At operation 384, underutilized equipment is identified. For example, an identified physical configuration of the telecommunications equipment (as depicted by image data captured by a client) may be evaluated to determine whether additional capacity exists. Examples of additional capacity include, but are not limited to, an unused port of a network card or network device or an empty expansion slot. Accordingly, the optical identification techniques described herein are used to identify excess capacity accordingly. Excess capacity may be identified indirectly (e.g., an indicator light associated with a port that is unlit) and/or a directly (e.g., the empty port itself).

Flow progresses to operation 386, where an action associated with the identified underutilized equipment is generated. Example actions include, but are not limited to, generating a service ticket to replace the telecommunications equipment with replacement telecommunication equipment (e.g., that reduces capacity to be closer to current or anticipated utilization) or providing an indication (e.g., to a customer, to a sales representative) of one or more potential services offered by the service provider, which the customer may utilize in order to make use of the identified excess capacity. In examples, a mapping or set of rules is used to determine an association between an identified underutilization and one or more actions that can be performed. For example, different actions may be taken depending on the type of telecommunications equipment or magnitude of excess capacity.

Moving to operation 388, the generated action is performed. In some examples, robotic process automation is used to perform one or more actions associated with a service ticket that was generated at operation 386. In other examples, an indication is provided to dispatch a service technician to the customer premises, such that a device of the service technician may ultimately perform aspects of method 240 discussed above with respect to FIG. 2B. As another example, an electronic communication is automatically generated and provided for display to a customer, wherein the electronic communication comprises an indication of one or more potential services identified at operation 386. If the customer determines to utilize such a potential service, an indication selecting a service may be received in response to the electronic communication, such that the selected service may be enabled with reduced overhead (e.g., processing time, setup expense, etc.) as a result of the excess capacity already being present. It will be appreciated that any of a variety of other examples of excess capacity may be addressed according to the disclosed techniques and that any of a variety of other actions may be performed. Flow terminates at operation 388.

Figure 4:
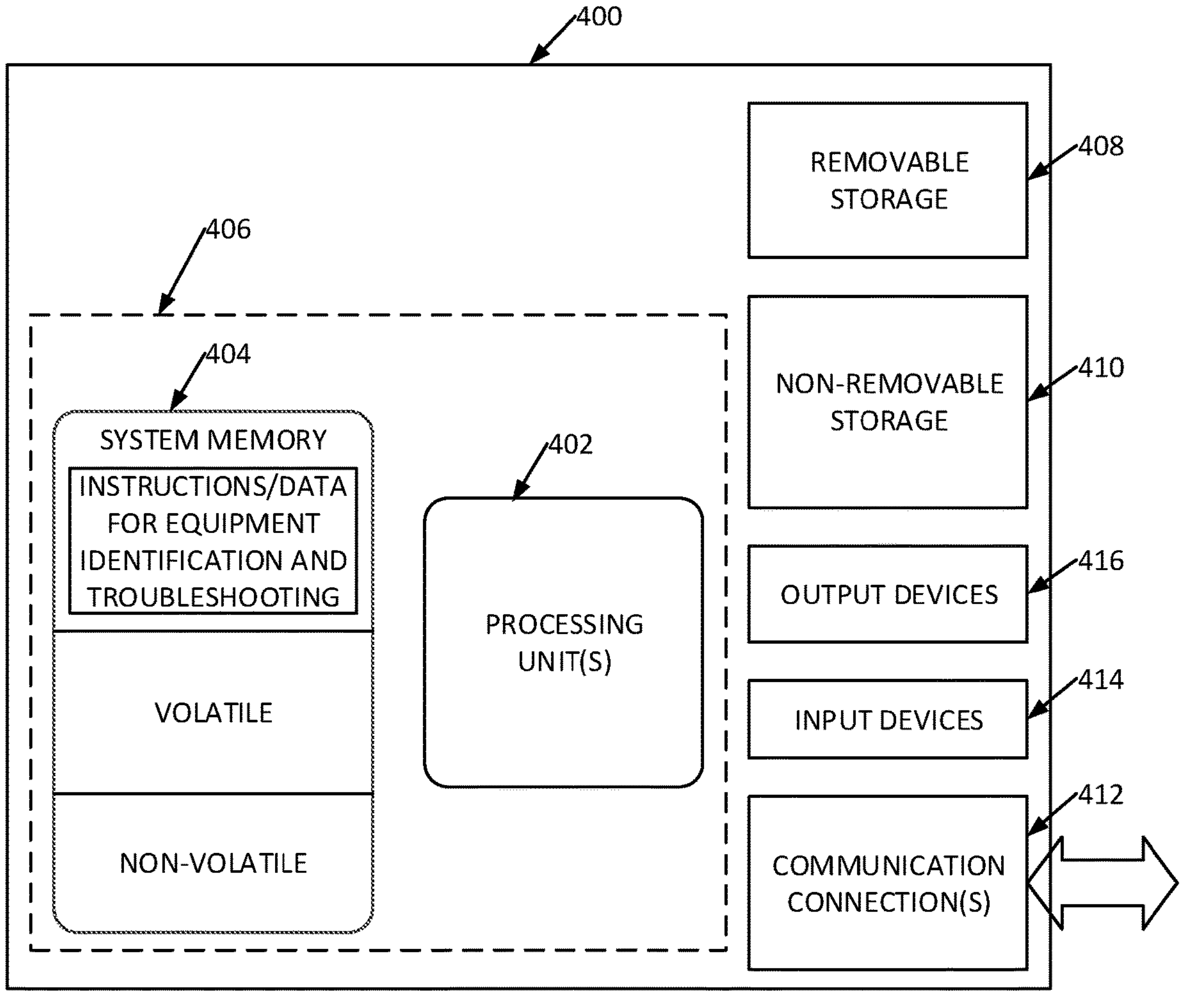
FIG. 4 illustrates an example of a suitable operating environment in which one or more of the present embodiments may be implemented.

FIG. 4 illustrates an example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically may include at least one processing unit 402 and memory 404. Depending on the exact configuration and type of computing device, memory 404 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as a keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. The computer readable media may be any available media that can be accessed by processing unit 402 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term “modulated data signal” may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules (e.g., applications, Input/Output (I/O) management, and other utilities) may perform processes including, but not limited to, one or more of the stages of the operational methods described herein such as the methods illustrated in FIGS. 2A-B and 3A-C, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
at least one processor; and
memory, operatively connected to the at least one processor and storing instructions that, when executed by the at least one processor, cause the system to perform a set of operations, the set of operations comprising:
receiving, from a client device, image data associated with telecommunications equipment;
processing the image data using a machine learning model to generate an equipment classification for the telecommunications equipment;
determining, based at least in part on the image data, an equipment configuration and an operational state for the telecommunications equipment;
evaluating the equipment configuration and the operational state to generate a predicted issue for the telecommunications equipment;
determining an action for the predicted issue; and
providing an indication of the determined action to the client device.

2. The system of claim 1, wherein generating the operational state for the telecommunications equipment comprises analyzing log data associated with the telecommunications equipment.

3. The system of claim 1, wherein the set of operations further comprises:
comparing a confidence score of the machine learning model to a predetermined threshold to determine whether to request additional information; and
based on determining to request additional information, generating a request for additional information from the client device, wherein the request comprises a set of image capture instructions.

4. The system of claim 1, wherein the set of operations further comprises:
generating an inventory record for the telecommunications equipment, the inventory record comprising at least one of the equipment configuration or the operational state.

5. The system of claim 4, wherein generating the inventory record further comprises:
determining an external data source associated with the telecommunications equipment;
accessing supplemental information from the external data source; and
storing at least a part of the supplemental information as part of the inventory record.

6. A method for updating an inventory associated with a customer in a data store, the method comprising:
receiving, from a client device, image data associated with telecommunications equipment;
processing the image data using a machine learning model to generate an equipment classification for the telecommunications equipment;
determining, based at least in part on the equipment classification, whether the inventory associated with the customer comprises an inventory record that relates to the telecommunications equipment;
based on determining that the inventory does not comprise an inventory record that relates to the telecommunications equipment, generating a new inventory record in the inventory, the new inventory record comprising the equipment classification for the telecommunications equipment.

7. The method of claim 6, further comprising:
based on determining that the inventory comprises an inventory record that relates to the telecommunications equipment, updating the inventory record based on the equipment classification for the telecommunications equipment.

8. The method of claim 6, wherein the method further comprises determining, based at least in part on the image data, an equipment configuration and an operational state for the telecommunications equipment, and wherein the new inventory record comprises the equipment configuration and the operational state.

9. The method of claim 6, further comprising:

determining, based at least in part on the image data, an equipment configuration and an operational state for the telecommunications equipment;

evaluating the equipment configuration and the operational state to generate a predicted issue for the telecommunications equipment;

determining an action for the predicted issue; and providing an indication of the determined action to the client device.

10. The method of claim 6, further comprising:

providing an indication of the equipment classification to the client device.

11. A method for determining an additional issue associated with a telecommunications device, comprising:

receiving, from a client device, image data associated with a first telecommunications device, wherein the first telecommunications device is associated with a first issue;

processing the image data using a machine learning model to generate an equipment classification for the first telecommunications device and a second telecommunications device;

determining a second issue for the second telecommunications device;

determining an action for the second issue; and providing an indication of the determined action for the second issue to the client device.

12. The method of claim 11, wherein the second issue is determined according to a proactive rule.

13. The method of claim 11, wherein the second issue is excess capacity associated with the second telecommunications device, and wherein the determined action is to replace the second telecommunications device with a third telecommunications device.

14. The method of claim 11, wherein the second issue is excess capacity associated with the second telecommunications device, and wherein the determined action is to provide an indication of one or more potential services associated with the excess capacity.

* * * * *